UNITED STATES PATENT OFFICE.

HUGO GALLINOWSKY, OF NEW ORLEANS, LOUISIANA, ASSIGNOR TO ANTHONY VIZARD, OF NEW ORLEANS, LOUISIANA.

TREATMENT OF WOOD WASTE AND KINDRED SUBSTANCES.

1,326,894. Specification of Letters Patent. Patented Dec. 30, 1919.

No Drawing. Application filed June 2, 1919. Serial No. 301,373.

*To all whom it may concern:*

Be it known that I, HUGO GALLINOWSKY, a citizen of the United States, residing at New Orleans, in the parish of Orleans, State of Louisiana, have invented certain new and useful Improvements in the Treatment of Wood Waste and Kindred Substances, which render such substances weatherproof and fireproof; and I do hereby declare the following to be a full, clear, and exact description of the invention, such as will enable others skilled in the art to which it appertains to make and use the same.

My present invention consists in a treatment of woodwaste, such as sawdust, to render it soft and flexible and fit to be used, with a small proportion of a cementitious binder to produce an artificial wood which is both fire-proof and weather-proof.

Following is the true description of the process:

I saturate the sawdust with a solution consisting of ninety (90) per cent. water and ten (10) per cent. hydrochloric acid, leave it under this treatment at least six (6) hours (but there is no limit to length of time).

When ready to use the sawdust, I squeeze the liquid from it as much as is easily possible.

The sawdust will be damp but plastic and contain some hydrochloric acid.

I add to this damp wood fiber from ten (10) to twenty-five (25) per cent. (by measure) fine powdered calcined magnesite and mix well. The hydrochloric acid still present in the wood fiber becomes neutralized by the magnesite forming hydrated magnesium chlorid which with the superplus of magnesite forms a well known Sorel cement intimately combined with the wood fiber.

If the mixture needs more moisture some magnesium chlorid solution may be added.

The compound thus produced may be rolled out into long boards or subjected to pressure for forming tiles, plates, shingles, ornaments, moldings, etc.

Having thus fully described my invention, what I claim, and desire to secure by Letters Patent of the United States, is—

1. A wood fiber treated by hydrochloric acid, squeezed free of superfluous acid and treated with calcined magnesite.

2. A wood fiber subjected to treatment by hydrochloric acid from six hours to three days or more, made free of superfluous acid, the damp fiber mixed with magnesite to neutralize the acid left in the fiber thereby forming magnesium chlorid.

3. The process of preparing a wood-base stock for articles of manufacture, wherein fragmentary wood is saturated with an acid; partially removing the acid; and then well mixing therewith an agent that will neutralize the acid and cement or solidify the fibrous substance.

4. The process of preparing a wood-base stock for articles of manufacture, wherein fragmentary wood is saturated with hydrochloric acid; partially removing the hydrochloric acid; and then mixing therewith an agent that will neutralize the hydrochloric acid and cement or solidify the fibrous substance.

5. The process of preparing a wood-base stock for articles of manufacture, wherein fragmentary wood is saturated with an acid; partially removing the acid; and then well mixing therewith an agent that will neutralize the acid and cement or solidify the fibrous substance, and compressing the stock into the desired shape before it has set.

6. The process of preparing a wood-base stock for making articles of manufacture thereof; which consists of saturating fragmentary wood with an acid without an excess of the liquid acid; and adding to the damp and plastic substance an agent that will form therewith a cement to bind the fibrous substance.

7. The process of preparing a wood-base stock for making articles of manufacture thereof; which consists of saturating fragmentary wood with hydrochloric acid without an excess of the liquid acid; and adding to the damp and plastic substance an agent that will form therewith a cement to bind the fibrous substance.

8. The process of preparing a wood-base stock for making articles of manufacture thereof; which consists of saturating fragmentary wood with an acid without an excess of the liquid acid; and adding to the damp and plastic substance an agent that will form therewith a cement to bind the fibrous substance, and then pressing the same into the shape desired.

9. The process of preparing a wood-base stock for articles of manufacture, wherein fragmentary wood is saturated with an acid; removing the excess acid; and then well mixing therewith powdered calcined magnesite; and then pressing the substance into the desired shape before it has set.

10. The process of preparing a wood-base stock for articles of manufacture wherein fragmentary wood is saturated with hydrochloric acid; and then well mixing therewith powdered calcined magnesite, and finally compressing the stock into the desired shape before it has set.

11. The process of preparing a wood-base stock for articles of manufacture wherein a granular wood mix is saturated with an acid; then well mixed with an agent that will neutralize the acid and cement or solidify the fibrous substance; and adding to the mix a solution of the acid and the agent to render the mix more plastic.

12. The process of preparing a wood-base stock for articles of manufacture wherein fragmentary wood is saturated with hydrochloric acid; well mixing therewith powdered calcined magnesite, and thinning the mix with a solution of magnesium chlorid.

In testimony whereof, I have hereunto set my hand this 12th day of May, A. D. 1919.

HUGO GALLINOWSKY.